Patented Mar. 9, 1948

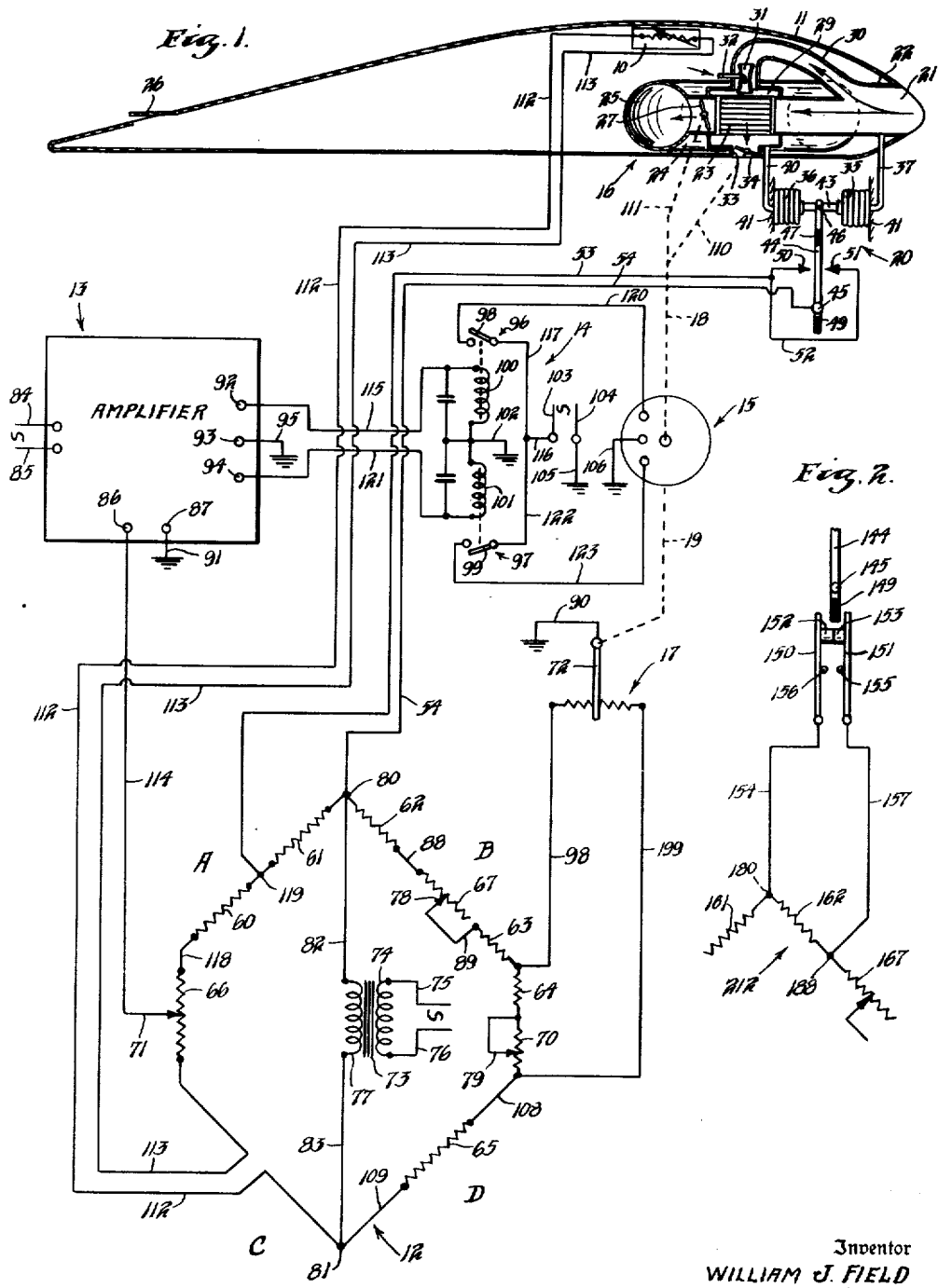

2,437,318

UNITED STATES PATENT OFFICE 2,437,318

AIRCRAFT HEATING CONTROL SYSTEM

William J. Field, Minneapolis, Minn., assignor to Minneapolis-Honeywell Regulator Company, Minneapolis, Minn., a corporation of Delaware Application January 31, 1944, Serial No. 520,439

16 Claims. (Cl. 244—134)

This invention relates to the field of aeronautics and more particularly to a solution of the problem created by the accretion of ice on airfoil surfaces during flight.

During flight, the formation of ice on an aircraft results from the freezing of water droplets which are intercepted by the leading edges and exposed surfaces. Supercooled water droplets exist in a majority of clouds when the temperature of the cloud is below 32° F. While there is a tendency towards the formation of ice-crystal clouds rather than water clouds, as the temperature decreases below the freezing point, water clouds can none the less be cooled to very low temperatures, and have been found even at −60° F. in the polar region.

Water in the liquid form at temperatures below freezing exists in a very unstable state and when disturbed is rapidly changed, at least partially, into ice. The impact of the droplet with various parts of the airplane is the disturbing influence which begins the freezing process.

The formation of ice on airfoil surfaces causes loss of lift by deformation of the airfoil section by the ice which is frozen on the leading edges. Under these conditions, the plane stalls at air speeds well above the normal stalling point. Formation of ice on airfoil surfaces also increases the drag, particularly when rough ice forms back of the leading edges and on various protuberances. A third undesirable effect brought about by accretion of ice is increase in the weight of the craft. It will be seen that the cumulative effect of these three factors may be of very serious consequence to the operation of the craft.

The rate of ice accretion has been found to depend upon a combination of a large number of factors, but principally upon the air speed, size of the cloud or rain droplets, their density in the atmosphere, and the shape of the external area of the airfoil surface. The rate of ice accumulation varies over wide ranges and may be less than one half an inch in one hour or over one inch in one minute. Cases have been reported where craft without deicing equipment have been forced down out of control after less than five minutes of flight through an icing region.

It is the purpose of this invention to provide a system for deicing aircraft wings and so forth which is peculiarly adapted to the unusual demands and conditions of this type of service. It is also an object of my invention to provide an aircraft heater including a combined heat generator and exchanger together with a control system particularly adapted to aircraft applications.

It is another object of my invention to provide an aircraft wing heating system in which the amount of heat delivered to the wing generally varies with the air speed of the craft, and thus with the heat loss.

It is a further object of my invention to provide, in an aircraft wing heating system having a burner whose heat output varies with the speed of the craft, means for preventing the flame of the burner from being extinguished due to speed of the craft in excess of the range to which the heater is adapted.

Further objects and advantages of my invention are set forth in the following description, taken with the accompanying drawings, and the novel features thereof are pointed out in the appended claims. The disclosure, however, is illustrative only, and I may make changes in detail, especially in matters of shape, size and arrangement of parts within the principle of the invention, to the full extent indicated by the broad general meanings of the terms in which the appended claims are expressed.

In the drawing,

Figure 1 is a schematic showing of a wing deicing system embodying my invention, and Figure 2 is a modification of the system shown in Figure 1.

Referring now to Figure 1 of the drawing, my wing deicing system is seen to comprise generally a temperature responsive member 10 consisting of a resistance element having a substantial positive temperature coefficient of resistance, mounted in heat conductive relationship with an airfoil 11 subject to accretion of ice, and arranged to influence the balance condition of an electric bridge 12 by its change in resistance with change in the ambient temperature. As a result of unbalance of bridge 12, a signal potential is impressed upon an amplifier 13 whose output selectively energizes one of a pair of relays generally indicated at 14 for initiating operation of a motor 15 in either a forward or a reverse direction. Operation of motor 15 is effective through a mechanical connection 18 to adjust the heat output of a heater means generally indicated at 16 so that on an increase in temperature of the airfoil surface the flow of air through the heater means is decreased, while on a decrease in temperature of the airfoil surface the flow of air through the heater means is increased. Operation of the motor at the same time acts through a link 19 upon a variable resistance member 17 to tend to rebalance the bridge; balancing of the bridge removes the signal potential from the amplifier, deenergizing the relays and therefore interrupting operation of the motor.

As more fully pointed out hereafter, heater means 16 depends for its operation on the flow of air therethrough, but if an excessive flow of air takes place the flame of the heater means is apt to be blown out, while if the air flows through the heater means at an unduly low rate, the flame is erratic and again may go out. A responsive means 20 is therefore provided and is electrically associated with bridge 12 so that, when the flow of air through the heater means increases or decreases in magnitude beyond predetermined limits, the bridge circuit is again unbalanced, independently of the response of temperature responsive member 10, in such a direction as to restrict the flow of air through the heater means. The structure of my system will now be considered in greater detail.

It will be seen that airfoil 11 is provided with an aperture 21 in its leading edge and that a conduit 22 is provided to conduct air entering through the aperture 21 at a rate depending on the velocity of the airfoil through the air, so that it passes through a heat exchange portion 23 of the heater means in a first direction and is thereafter conducted by a conduit 24 into a manifold 25. Manifold 25 passes longitudinally along the airfoil in the neighborhood of its leading edge, and is provided with a series of apertures whereby the heated air flowing therethrough is directed against the inner surface of the leading edge of the airfoil to raise its temperature. A suitable means, such as aperture 26 in the trailing edge of the airfoil, is provided for the escape of the air after it has given up its heat. A damper 27 is arranged in conduit 24 to restrict the passage of air therethrough.

Conduit 22 is further provided with a branch 30 which is adapted to conduct a portion of the air entering at aperture 21 through heater means 16 along an independent path which includes a combustion chamber 29 surrounding the passages of heat exchanger 23. Branch 30 is provided, near its point of junction with combustion chamber 29, with a Venturi member 31 which cooperates with a fuel supply nozzle 32 to provide a flow of combustible vapor to the combustion chamber. The products of combustion are conducted directly to the outside of the airfoil through a short conduit 33, and this conduit is provided with a second damper 34. The amount of fuel provided to the burner is dependent on the rate of flow of the air with respect to Venturi member 31, and this rate of flow in turn depends upon the speed of movement of the airfoil through the air; that is, upon the airspeed of the craft. It has been found, however, that if the flow of air passing Venturi member 31 exceeds a certain magnitude, the effect is to extinguish the flame of the burner rather than to increase its heat output. Similarly, if the flow of air passing Venturi member 31 is of less than a certain magnitude, the flow of fuel to the burner is not regular, and erratic operation of the burner results.

The flow of air past Venturi member 31 may be determined by observing the pressure differential between the combustion chamber and conduit 22: a pressure differential in excess of a determinable value is indicative of excessive flow of air past Venturi member 31, while similarly, a pressure differential which is less than a second determinable value is indicative of an insufficient flow of air past venturi 31. To determine the pressure differential just described, I provide a pair of bellows members 35 and 36 rigidly mounted on suitable support members 41 and connected as by tubes 37 and 40 with conduit 22 and combustion chamber 29 respectively. The free ends of bellows members 35 and 36 are joined as by a link 42 of such length that when there is no pressure differential both bellows are considerably compressed.

An arm 44, pivoted as at 45, is connected in a suitable fashion as at 46 with link 42, so that motion of link 42 to the left as seen in the figure causes arm 44 to rotate about its pivot in a counter-clockwise direction. Arm 44 is provided with an insulating portion 47, and the arm is also suitably insulated from its pivot. A pair of contact members 50 and 51 are arranged for electrical cooperation with arm 44, so that a predetermined displacement of the arm in a counter-clockwise direction will cause the arm to make electrical connection with contact 50, while a predetermined displacement of the arm in a clockwise direction will cause the arm to make electrical connection with contact 51. Contacts 50 and 51 are electrically connected as by conductor 52 and are joined to the bridge by conductor 53, and arm 44 is connected with the bridge by a conductor 54, in a fashion now to be described.

Bridge 12 is constructed along the general lines of the familiar Wheatstone bridge and comprises fixed resistors 60, 61, 62, 63, 64, and 65 and variable resistors 66, 67, 70, and 17, having movable contacts 71, 78, 72, and 79 respectively. Resistors 64 and 70 in series are connected in parallel with resistor 17, so that the relative magnitude of the currents flowing in the series combination and in resistor 17, respectively, due to a potential difference across the parallel network may be varied. Electrical energy is provided to the bridge by a transformer 73 whose primary winding 74 is connected to a suitable supply of alternating current as by conductors 75 and 76 and whose secondary winding 77 is connected to the input terminals 80 and 81 of the bridge as by conductors 82 and 83.

A circuit may be traced around the bridge as follows: input terminal 80, resistor 62, conductor 88, resistor 67, movable contact 78, conductor 89, resistor 63, conductor 98, resistor 17, conductors 199 and 108, resistor 65, conductor 109, input terminal 81, conductor 112, resistance bulb 10, conductor 113, resistor 66, conductor 118, resistor 60, conductor 119, resistor 61 and back to input terminal 80. Movable contacts 71 and 72 of resistors 66 and 17 comprise respectively the output terminals of the bridge: contact 72 is grounded as by conductor 90 and terminals 87 and 93 of amplifier 13 are grounded as by conductors 91 and 95.

For convenience, let the resistance in the circuit between input terminal 80 and movable contact 71 be of a magnitude A, that between terminal 80 and movable contact 72 of magnitude B, that between movable contact 71 and input terminal 81 of magnitude C, and that between movable contact 72 and input terminal 81 of magnitude D. The balance condition of the bridge is that at which no potential difference exists between movable contacts 71 and 72, and this condition obtains when $A/B = C/D$. For any given setting of resistors 66, 67, and 70, there are only two variable resistors in the bridge, resistance bulb 10 and resistor 17. Since the resistance of resistance 10 varies directly with changing temperature, a decrease in C due to a fall in temperature causes an unbalance in the bridge, which can only be rebalanced by a movement of movable contact 72 to decrease D and increase B until the above equation again holds true.

Amplifier 13 is provided with alternating current through conductors 84 and 85, and has input terminals 86 and 87 and output terminals 92, 93, and 94, terminal 93 being grounded. The amplifier may be of any suitable design, and is of such a type that an input signal of a first time-phase relationship impressed upon input terminals 86 and 87 is effective to produce an output signal across output terminals 92 and 93, while an input signal of the opposite time-phase relationship is adapted to produce an output signal across output terminals 94 and 93.

A pair of relays 96 and 97, including circuit controlling members 98 and 99, have their windings 100 and 101 connected in the output circuit of amplifier 13 by conductors 115 and 121 in such a fashion that the appearance of an output signal across output terminals 92 and 93 is effective to energize the relay 96, while the appearance of an output signal across terminals 94 and 93 is effective to energize the relay 97. The circuit between the relays and output terminal 93 is completed through a second ground connection 102 common to both relay windings.

The operation of relays 96 and 97 is effective to control the supply of alternating current from a suitable source supplied by conductors 103 and 104 to motor 15 in such a fashion as to energize the motor for selective forward and reverse operation, depending on which of the relays is energized. To this end, conductor 103 is connected to the circuit controller members of the relays, which control the flow of current to selected windings of the motor, while conductor 104 is grounded as at 105: the windings of motor 15 are suitably grounded as at 106.

Rotation of the shaft of motor 15 is transmitted to movable contact 72 through connection 19, and the second mechanical connection 18 transmits rotation of the motor shaft to dampers 27 and 34 by branches 110 and 111. The mechanical arrangements are such that rotation of the motor in a direction tending to close the dampers acts also to move contact 72 to the left as seen in the figure whereby to increase D and decrease B. The electrical connections between bridge 12, amplifier 13, relays 14, and motor 15 assure that the relay energized by amplifier 13 on an unbalance signal from the bridge, due to a decrease in C, initiates operation of motor 15 in a direction which opens the dampers and moves contact 72 to the right.

Before outlining the method in which the system functions, it should be pointed out that resistor 66 is made adjustable to provide means for calibrating the bridge circuit, and that resistor 67 is made adjustable to provide means for varying the control point of the bridge circuit: resistor 70 is made adjustable to provide means for adjusting the differential response of the bridge circuit. It will be understood that if it is desired to construct a bridge to meet one specific set of conditions, none of these resistors needs to be variable, but may be constructed to the exact value desired or in some cases omitted altogether, the resistive effects being provided by other resistors forming a permanent part of the bridge.

It should also be pointed out that the effect of contact between arm 44 and contact 50 or 51 is to short out resistor 61, and therefore produce a marked unbalance in the bridge due to a decrease in B.

The function of my system will now be described. First let it be assumed that the craft of which airfoil 11 forms a part is in motion through the atmosphere at a speed within the range causing a pressure differential such that arm 44 makes contact neither with contact 50 nor with contact 51, and that the temperature of the airfoil surface is well above that at which icing could occur. That being the case, the resistance of temperature responsive resistor 10 is such that the bridge is in balance at a position of contact 72 along resistor 17 resulting from a rotated position of motor 15 corresponding to complete closure of dampers 27 and 34. The bridge being in balance, contacts 71 and 72 are at the same potential and no signal is impressed across the input terminals of amplifier 13. No output signal is transmitted to relays 14, and therefore motor 15 remains unenergized.

Now let it be assumed that the craft of which airfoil 11 comprises a portion moves into an atmosphere whose temperature is falling. The resistance of resistor 10 decreases in response to this change in temperature, unbalancing the bridge circuit by decreasing C: all other values of resistances in the bridge circuit remain as before. Decrease in the resistance of resistance bulb 10 decreases the total resistance of that portion of the bridge including resistors 61, 60, 66 and 10, and an increased current flows therein. Now, although A has not changed, the current through A has increased, and therefore the voltage drop through A has increased; this voltage drop through B remains the same. Contacts 71 and 72 are no longer at the same potential, but a voltage appears across them, the potential difference between contacts 71 and 72 having the same phase relation as that between terminals 81 and 80. This signal potential is impressed upon amplifier 13 as by conductor 114 and ground connections 90 and 91, and results in the appearance of an output potential between terminals 92 and 93. This potential is conducted to winding 100 of relay 96 through ground connections 95 and 102 and conductor 115, energizing relay 96 to complete a circuit providing alternating current to motor 15 as follows: conductors 103, 116, and 117, circuit controlling member 98, conductor 120, motor 15, ground connections 106 and 105, and back to conductor 104. Completion of this circuit energizes motor 15 to rotate in such a direction as to open dampers 27 and 34, and to move contact 72 to the right along resistor 17. This movement of contact 72 increases B and decreases D in the equation given above, without changing the total resistance between terminal 80 through resistor 17 to terminal 81. Thus although the current through B remains the same, B itself increases until the voltage drop through B is the same as that through A. When this condition prevails, contacts 71 and 72 are again at the same potential, no signal is impressed upon the input of the amplifier, and operation of the motor is interrupted.

This rotation of motor 15, however, has at the same time rotated dampers 27 and 34 into partly open positions, and air flows through the venturi of the heater means, providing in the burner a combustible vapor and means for supporting the combustion. At the same time, suitable means, not shown, are actuated, in any conventional fashion, to ignite the combustible vapor now being provided in combustion chamber 23. A suitable control system is operatively associated with the igniting means just referred to for detecting the absence of flame in the burner and actuating the igniting means, whenever the response of the bridge and the position of damper 34 indicates the need of increase in temperature of the airfoil. It will readily become apparent that further drop in temperature results in further change in the resistance of resistor 10 in the same sense, and accordingly produces wider opening of dampers 27 and 34 and increased fuel consumption and therefore increased heat output by the heater means. This is true regardless of whether the further temperature decrease is due to passage of the craft into a cooler atmosphere or to increased conductive heat loss due to increased airspeed.

At the same time that damper 34 was opened to permit the generation of heat in the combustion chamber of the heater means, damper 27 was also opened allowing air to flow through the heat exchanger and to be warmed by heat exchange relation therewith. Further flow of this heated air through manifold 25 and impingement of the heated air with the interior of the airfoil near its leading edge act to give up heat to the airfoil, and if sufficient volume of air at sufficiently high temperature is thus discharged, the temperature of the surface begins to rise. Resistance bulb 10 is shown at a position relatively remote from the leading edge of the airfoil, where maximum icing occurs, but the relative propinquity of the bulb and the leading edge is a matter left at the discretion of the designer, since more or less heat lag between the leading edge and the bulb may in some cases be considered desirable.

It must be understood that, so long as an accretion of ice overlies the airfoil, little increase in the airfoil temperature above 32° F. can occur. However, when a layer of ice next the airfoil is melted, vibration, gravity, and wind pressure combine to cause the ice to fall away from the airfoil, and after the remaining water evaporates the temperature of the airfoil rises rather rapidly at first, to a value depending on the temperature of the ambient air and the total area of the airfoil conducting heat therefrom, and also upon the air speed of the airfoil as it affects the output of the heater means.

With a rise in temperature, the resistance C of bulb 10 increases, and with it the total resistance of that portion of the bridge including resistors 61, 60, 66, and 10, and a decreased current flows therein. Now although A has not changed, the current through A has decreased and therefore the voltage drop through A has decreased, the voltage drop through B remaining the same. Contacts 71 and 72 are no longer at the same potential, but a voltage appears across them, the potential difference between contacts 71 and 72 having the same phase relation as that between terminals 80 and 81. It is thus evident that the signal impressed upon the input of the amplifier when the resistance bulb indicates an increase in temperature is 180° out of phase with that impressed upon the amplifier when the resistance bulb indicates a decrease in temperature.

In the same manner as that previously discussed, a signal potential is impressed upon amplifier 13 by conductor 114 and ground connections 90 and 91, but this signal results in the appearance of an output potential between terminals 94 and 93 of the amplifier. This potential is conducted to winding 101 of relay 97 through ground connections 95 and 102 and conductor 121 is energizing relay 97 to complete a circuit providing alternating current to motor 15 as follows: conductors 103, 116, and 122, circuit controlling member 99, conductor 123, motor 15, ground connections 106 and 105, and back to conductor 104. Completion of this circuit energizes motor 15 to rotate in such a direction as to close dampers 27 and 34, and to move contact 72 to the left along resistor 17. This movement of contact 72 decreases B and increases D in the equation given above without changing the total resistance between terminal 80 through resistor 17 to terminal 81. Thus, although the current through B remains the same, B itself decreases until the voltage drop through B is the same as that through A. When this condition prevails, contacts 71 and 72 are again at the same potential, no signal is impressed upon the input of the amplifier, and operation of the motor is interrupted.

This rotation of motor 15, however, has at the same time rotated dampers 27 and 34 into more nearly closed positions and the air flow through the burner portion of the heater means is restricted, reducing the supply of combustible vapor to the burner. If the increase in temperature is of sufficient magnitude, as for example, if the craft emerges into an atmosphere of relatively higher temperature, the change in resistance of bulb 10 may be so great that in order to produce a balancing change in resistance of resistor 17, motor 15 causes contact 72 to move to the left through its full stroke, simultaneously entirely closing dampers 27 and 34. It will be understood that conventional limit switches, not shown, are provided on the shaft of motor 15 to interrupt energization of the motor as it approaches extreme positions before damage is done to the instrument. It will also be understood that closing of damper 34 interrupts the supply of combustible vapor through the burner, whose flame is therefore extinguished.

Suppose now that the craft of which airfoil 11 comprises a part performs a maneuver which greatly increases its airspeed: for instance, suppose it goes into a power dive. The flow of air through conduit 22 immediately becomes large and produces a pressure differential between the combustion chamber and the conduit sufficient to cause arm 44 to make electrical contact with contact 50. The effect of this is to short circuit resistance 61, thus producing a large decrease in the resistance A, which results in the appearance of a large unbalance signal upon input terminals 86 and 87. This signal is of the same phase as that impressed thereon by increase in the resistance of resistor 10 due to rise in temperature, and results in an output signal across terminals 94 and 93 of amplifier 13 which energizes relay 97 through conductor 121 and ground connections 102 and 95. Energization of relay 97 is effective to provide electrical energy to motor 15 through a circuit which may be traced as follows: conductors 103, 116, and 122, circuit closing member 99, conductor 123, motor 15, ground connections 106 and 105, and back to conductor 104. Motor 15 is thus energized to rotate in a direction to close dampers 27 and 34 and at the same time moves contact arm 72 to the left as shown in the figure to decrease resistance B and increase D. However, the size of resistor 61 is so selected that for any value of resistance of the bulb 10, the bridge cannot be balanced within the possible range of movement of contact 72, so that motor 15 rotates until it opens a limit switch, not shown, contact 72 being near the left end of resistor 17.

While the abnormal air speed continues, the resistance of bulb 10 may still change in either direction, depending on the atmospheric conditions through which the craft is diving. When the craft levels out, the pressure differential decreases so that arm 44 no longer makes contact with contact 50, resistor 61 is again included in resistance A, and the position of contact 72 at the left end of resistor 17 results in a large unbalance of the bridge in the direction opposite to that previously described, unless the craft has descended into such a warm atmosphere that resistance C is great compared to resistance A. In any case, the circuit operates as detailed above to bring about a state of affairs in which A/C=B/D, when the dampers 27 and 34 are in a position regulating the supply of heat to the airfoil in accordance with the temperature at bulb 10.

It will be apparent that a decrease in pressure differential sufficient to cause arm 44 to come into contact with contact 51 has the same effect on the bridge circuit and therefore upon the operation of motor 15 as the increase in pressure differential just described.

In the direction of the system I have just set forth, it will be seen that arm 44 and contacts 50 and 51 comprise a pair of normally open switches connected in parallel, and that variation in the pressure acts to close one of these switches depending upon whether the variation is due to excessively large or excessively small pressure differential. Since under certain conditions it is desirable to use a normally closed switch rather than a normally open switch, I show in Figure 2 a switch suitable for such use.

It will be noted that arm 144 is provided with an insulated portion 149 on that side of pivot 145 remote from the pressure responsive members. A pair of arms 150 and 151 bearing respectively contact members 152 and 153 are normally spring urged toward one another so that members 152 and 153 make electrical contact. Portion 149 of arm 144 projects between arms 150 and 151, but does not touch either, if the pressure differential is within the selected range. However, if arm 144 is rotated in response to variation in the pressure differential in a counter-clockwise direction, insulated member 149 contacts arm 151 and moves it away from arm 150. Stops 155 and 156 are provided so that substantial motion of either of the arms toward the other beyond a position corresponding to contact between members 152 and 153 is prevented; therefore, movement of arm 151 in response to pressure by portion 149 of arm 144 is effective to open the electrical circuit between contacts 152 and 153. Arm 150 is connected to input terminal 180 of bridge 212 by conductor 154 and arm 151 is connected to the electrical connection 188 between resistors 162 and 167 as by conductor 157. In the normal condition of the switch, resistor 162 is shorted out of the bridge, the size of whose resistors are selected to be appropriate to this modified construction. If the electrical connection between contacts 152 and 153 is for any reason interrupted, this short circuit is broken and a resistance of the value of resistor 62 is inserted into the upper right hand arm of the bridge. As is well known to those familiar with the Wheatstone bridge, the insertion of added resistance in the upper right hand arm of the bridge has the same effect on the bridge as the shorting out of an equivalent resistance in the upper left hand arm of the bridge. Therefore, the system functions as clearly described in connection with Figure 1.

In the foregoing specification I have completely disclosed a system for heating airfoil surfaces to prevent the accretion of ice thereon, and for removing any accretion of ice inadvertently allowed to form. My system includes improvements and features of novelty particularly relating to the regulation of this system to perform its function under normal conditions, and also safety means for overriding normal control of my system in the event of abnormal conditions of operation. Since minor changes and equivalent expedients may occur to those skilled in the art after a study of the specification, I therefore wish this disclosure to be considered as illustrative only, and to be limited only by the following claims.

I claim as my invention:

1. In a device of the class described, in combination, a hollow airfoil surface having a leading edge, a fuel burner in heat transfer relation with said surface in the region of said edge, and normally ineffective air pressure responsive means for responsively causing restriction of the supply of fuel to said burner in the event of limiting air pressure conditions.

2. In a device of the class described, in combination, a hollow airfoil surface having a leading edge, a fuel burner in heat transfer relation with said airfoil surface in the region of said leading edge, means for supplying a combustible mixture of fuel and air to said burner, and normally ineffective air pressure responsive means for responsively causing restriction of said supply of combustible mixture in the event of limiting air pressure conditions.

3. In a device of the class described, in combination, a hollow airfoil surface having a leading edge, a fuel burner in heat transfer relation with said airfoil surface in the region of said leading edge, means for supplying a combustible mixture of fuel and air to said burner, air pressure responsive means for responsively causing restriction of said supply of combustible mixture, and temperature responsive means for independently causing restriction of said supply of combustible mixture.

4. In a device of the class described, in combination, a hollow airfoil surface having a leading edge, heater means in heat transfer relation with said airfoil surface in the region of said leading edge, said heater means comprising a first conduit for air to be heated, and a second conduit including a combustion chamber, means adapted to conduct fuel to said chamber, and Venturi means for causing flow of air and of said fuel in a combustible mixture into said combustion chamber, means for supplying air to said conduits, and air pressure responsive means for responsively causing restriction of the flow of said air through said conduits.

5. In a device of the class described, in combination, a hollow airfoil surface having a leading edge, heater means in heat transfer relation with said airfoil surface in the region of said leading edge, said heater means comprising first conduit means for air to be heated and second conduit means including a combustion chamber, means adapted to conduct fuel to said chamber, and Venturi means for causing flow of air and of said fuel in a combustible mixture into said combustion chamber, means providing a flow of air through said conduits in magnitude proportional to the velocity of said surface in moving through the atmosphere, and means for causing restriction of the flow of said air through said conduits on excessive departure of the magnitude of said air flow from a predetermined value.

6. In a device of the class described, in combination, a hollow airfoil surface having a leading edge, heater means in heat transfer relation with said airfoil surface in the region of said leading edge, said heater means comprising first conduit means for air to be heated and second conduit means including a combustion chamber, means adapted to conduct fuel to said chamber, and Venturi means for causing flow of air and of said fuel in a combustible mixture into said combustion chamber, means providing a flow of air through said conduits in magnitude proportional to the velocity of said surface in moving through the atmosphere, means for restricting the flow of air through said conduits, means electrically responsive to the temperature of said airfoil surface, means electrically responsive to the magnitude of said air flow, and motor means actuating said restricting means under the influence of said responsive means, whereby to restrict said flow of air independently on excessive rise of the temperature of said surface and on excessive departure of the magnitude of said flow from a predetermined value.

7. In an aircraft deicing system, a hollow airfoil surface, heater means including a burner in convective heat transfer relation with said airfoil surface, Venturi means for supplying fuel to said burner, means directing air through said Venturi means at a velocity determined by the speed of said surface in moving through the atmosphere, and means, responsive to the velocity of said air, for causing restriction of the flow of said air on excessive departure of said velocity from a predetermined value.

8. In a device of the class described, in combination, a hollow airfoil surface, first means delivering air within said airfoil surface, heater means for raising the temperature of said air, said heater means comprising means adapted to conduct liquid fuel to said heater means and Venturi means adapted to atomizingly dispense said fuel from said first means, second means delivering air to said Venturi means, third means conducting products of combustion from said heater means, restricting means in said last mentioned means, means in said first mentioned means for restricting the flow of air having passed through said heater means, temperature responsive means actuating said restricting means, electric circuit interrupting means actuated by the difference in pressure between said second means and said third means, and means operatively associating said motor, said temperature responsive means and said pressure responsive means whereby each of said last mentioned means may independently influence the operation of said motor.

9. In a device of the class described, in combination, a hollow airfoil surface having a leading edge and a trailing edge, heater means, first means conducting air to said heat exchanger, second means delivering air from said heater means to the interior of said airfoil surface in the region of said leading edge, said heater means including a burner, third means adapted to supply liquid fuel to said burner, fourth means for pneumatically causing flow of fluid from said supply means in the form of an atomized spray, said first means further conducting air to said fourth means, fifth means conducting products of combustion from said heater means, sixth means restricting the flow of air through said second means, seventh means restricting the flow of air through said fifth means, motor means actuating said restricting means, ninth means electrically responsive to the temperature of said airfoil surface, tenth means operatively associating said temperature responsive means and said motor means, eleventh means mechanically responding to the pressure differential between said first means and said first means, electric circuit interrupting means actuated by said eleventh means, and means electrically associating said interrupting means with said ninth means, whereby operation of said motor means may be influenced independently by said ninth means and said interrupting means.

10. In a device of the class described, in combination, an aircraft member having a portion to be heated, a fuel burner in heat transfer relation with said member in the region of said portion, means supplying air to said burner at a rate depending upon the air speed of said aircraft, and normally ineffective means responsive to said air speed for limiting the heat output of said burner under conditions of either excessively low or excessively high air speed.

11. In a device of the class described, in combination, a hollow airfoil surface having a leading edge, a fuel burner in heat transfer relation with said surface in the region of said edge, means supplying air to said burner at a rate depending upon the speed of said surface with respect to the air, and normally ineffective means responsive to said speed for limiting the heat output of said burner under adverse conditions.

12. In a device of the class described, in combination, a hollow airfoil surface having a leading edge, heater means in heat transfer relation with said airfoil surface in the region of said leading edge, said heater means comprising a first conduit for air to be heated, and a second conduit including a combustion chamber, means adapted to conduct fuel to said chamber, means supplying air to said combustion chamber at a rate depending upon the speed of said airfoil through the air, and means responsive to said speed of said airfoil for causing restriction of the flow of said air.

13. In a device of the class described, in combination, a hollow airfoil surface having a leading edge, heater means in heat transfer relation with said airfoil surface in the region of said leading edge, said heater means comprising first conduit means for air to be heated and second conduit means including a combustion chamber, means adapted to conduct fuel to said chamber, means supplying air to said combustion chamber at a rate depending upon the speed of said airfoil through the air, and means responsive to said speed of said airfoil for causing restriction of the flow of said air.

14. In a device of the class described, in combination, an aircraft member having a portion to be heated, heater means in heat transfer relation with said aircraft member in the region of said portion, said heater means comprising first conduit means for air to be heated and second conduit means including a combustion chamber, means adapted to conduct fuel to said chamber, and Venturi means for causing flow of air and of said fuel in a combustible mixture into said combustion chamber, means providing a flow of air through said conduits in magnitude proportional to the velocity of said surface in moving through the atmosphere, means for restricting the flow of air through said conduits, means electrically responsive to the temperature of said aircraft member, means electrically responsive to the magnitude of said air flow, and motor means actuating said restricting means under the influence of said responsive means, whereby to restrict said flow of air independently on excessive rise of the temperature of said surface and on excessive departure of the magnitude of said flow from a predetermined value.

15. In apparatus for controlling heater means for a vehicle wherein the operation of the heater means is dependent on the rate of air flow through said means, in combination, conduit means for conducting air through said heater means, means for controlling air flow through said conduit, and normally ineffective means responsive to the rate of air flow through said conduit for regulating said controlling means in a manner to limit the maximum rate of air flow through said conduit to a predetermined value.

16. In apparatus for controlling heater means for a vehicle wherein the operation of the heater means is dependent on the rate of air flow through said means, in combination, conduit means for conducting air through said heater means, means for controlling air flow through said conduit, and normally ineffective means responsive to the rate of air flow through said conduit for regulating said controlling means in a manner to limit the minimum rate of air flow through said conduit to a predetermined value.

WILLIAM J. FIELD.

REFERENCES CITED

The following references are of record in the file of this patent:

UNITED STATES PATENTS

| Number | Name | Date |
|---|---|---|
| Re. 22,272 | Price | Feb. 16, 1943 |
| 2,022,959 | Gordon | Dec. 3, 1935 |
| 2,063,477 | Young et al. | Dec. 8, 1936 |
| 2,262,003 | Huffman et al. | Nov. 11, 1941 |
| 2,314,089 | Hess et al. | Mar. 16, 1943 |
| 2,321,940 | Robertson | June 15, 1943 |
| 2,337,484 | McCollum | Dec. 21, 1943 |
| 2,364,458 | McCollum | Dec. 5, 1944 |

Certificate of Correction

Patent No. 2,437,318.   March 9, 1948.

WILLIAM J. FIELD

It is hereby certified that errors appear in the printed specification of the above numbered patent requiring correction as follows: Column 9, line 27, for "direction" read *description*; column 11, line 54, claim 8, after the syllable and hyphen "respon-" insert *sive means within said airfoil surface, motor*; column 12, line 11, for "first" read *fifth*; and that the said Letters Patent should be read with these corrections therein that the same may conform to the record of the case in the Patent Office.

Signed and sealed this 26th day of October, A. D. 1948.

[SEAL]

THOMAS F. MURPHY,
*Assistant Commissioner of Patents.* the flow of air through said conduits, means electrically responsive to the temperature of said aircraft member, means electrically responsive to the magnitude of said air flow, and motor means actuating said restricting means under the influence of said responsive means, whereby to restrict said flow of air independently on excessive rise of the temperature of said surface and on excessive departure of the magnitude of said flow from a predetermined value.

15. In apparatus for controlling heater means for a vehicle wherein the operation of the heater means is dependent on the rate of air flow through said means, in combination, conduit means for conducting air through said heater means, means for controlling air flow through said conduit, and normally ineffective means responsive to the rate of air flow through said conduit for regulating said controlling means in a manner to limit the maximum rate of air flow through said conduit to a predetermined value.

16. In apparatus for controlling heater means for a vehicle wherein the operation of the heater means is dependent on the rate of air flow through said means, in combination, conduit means for conducting air through said heater means, means for controlling air flow through said conduit, and normally ineffective means responsive to the rate of air flow through said conduit for regulating said controlling means in a manner to limit the minimum rate of air flow through said conduit to a predetermined value.

WILLIAM J. FIELD.

REFERENCES CITED

The following references are of record in the file of this patent:

UNITED STATES PATENTS

| Number | Name | Date |
| --- | --- | --- |
| Re. 22,272 | Price | Feb. 16, 1943 |
| 2,022,959 | Gordon | Dec. 3, 1935 |
| 2,063,477 | Young et al. | Dec. 8, 1936 |
| 2,262,003 | Huffman et al. | Nov. 11, 1941 |
| 2,314,089 | Hess et al. | Mar. 16, 1943 |
| 2,321,940 | Robertson | June 15, 1943 |
| 2,337,484 | McCollum | Dec. 21, 1943 |
| 2,364,458 | McCollum | Dec. 5, 1944 |

Certificate of Correction

Patent No. 2,437,318.

March 9, 1948.

WILLIAM J. FIELD

It is hereby certified that errors appear in the printed specification of the above numbered patent requiring correction as follows: Column 9, line 27, for "direction" read *description*; column 11, line 54, claim 8, after the syllable and hyphen "respon-" insert *sive means within said airfoil surface, motor*; column 12, line 11, for "first" read *fifth*; and that the said Letters Patent should be read with these corrections therein that the same may conform to the record of the case in the Patent Office.

Signed and sealed this 26th day of October, A. D. 1948.

[SEAL]

THOMAS F. MURPHY,
*Assistant Commissioner of Patents.*